US012810620B2

(12) United States Patent
Chen et al.

(10) Patent No.: US 12,810,620 B2
(45) Date of Patent: Nov. 24, 2026

(54) VEHICLE DETECTION METHOD, AND CONTROLLER, PROGRAM AND STORAGE MEDIUM

(71) Applicant: BYD COMPANY LIMITED, Shenzhen (CN)

(72) Inventors: Meizhu Chen, Shenzhen (CN); Chujun Chen, Shenzhen (CN); Kaikuo Zhuo, Shenzhen (CN); Weihua Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 203 days.

(21) Appl. No.: 18/975,979

(22) Filed: Dec. 10, 2024

(65) Prior Publication Data

US 2025/0104441 A1 Mar. 27, 2025

Related U.S. Application Data

(63) Continuation of application No. PCT/CN2023/084896, filed on Mar. 29, 2023.

(30) Foreign Application Priority Data

Jun. 30, 2022 (CN) ........................ 202210771256.7

(51) Int. Cl.
*G06V 20/54* (2022.01)
*G06V 10/74* (2022.01)

(52) U.S. Cl.
CPC .............. *G06V 20/54* (2022.01); *G06V 10/74* (2022.01)

(58) Field of Classification Search
CPC ............................... G06V 20/54; G06V 10/74
USPC .......................................................... 382/103
See application file for complete search history.

(56) References Cited

U.S. PATENT DOCUMENTS

2016/0221592 A1* 8/2016 Puttagunta .............. B61L 27/04
2019/0144025 A1* 5/2019 Gao .................... B61L 15/0062 701/19
2020/0272838 A1 8/2020 Vladimerou et al.

FOREIGN PATENT DOCUMENTS

CN 107301779 A 10/2017
CN 109398424 A 3/2019
CN 110444013 A 11/2019
CN 110675516 A 1/2020
CN 111523527 A 8/2020
CN 111739338 A 10/2020
(Continued)

OTHER PUBLICATIONS

International Search Report and Written Opinion for Application No. PCT/CN2023/084896, mailed on Jun. 20, 2023, 9 pages.

*Primary Examiner* — Jonathan S Lee
(74) *Attorney, Agent, or Firm* — Sheppard Mullin Richter & Hampton LLP

(57) ABSTRACT

A vehicle detection method includes: acquiring point cloud data of a target detection area and image information of the target detection area; in response to determining, according to the point cloud data, that there is a target vehicle in the target detection area, determining a target vehicle type of the target vehicle according to the point cloud data; determining a target vehicle identifier of the target vehicle according to the image information; and comparing the target vehicle type and the target vehicle identifier with a legitimate-vehicle information database, so as to determine whether the target vehicle is an illegitimate vehicle.

20 Claims, 7 Drawing Sheets

(56) References Cited

FOREIGN PATENT DOCUMENTS

| | | | |
|---|---|---|---|
| CN | 111776012 | A | 10/2020 |
| CN | 112242062 | A | 1/2021 |
| CN | 112447041 | A | 3/2021 |
| CN | 112492545 | A | 3/2021 |
| CN | 109774747 | B | 4/2021 |
| CN | 112706805 | A | 4/2021 |
| CN | 112908017 | A | 6/2021 |
| CN | 113030990 | A | 6/2021 |
| CN | 113721621 | A | 11/2021 |
| CN | 113895482 | A | 1/2022 |
| CN | 113954922 | A | 1/2022 |
| CN | 114463372 | A | 5/2022 |
| KR | 102157848 | B1 | 9/2020 |
| KR | 102306083 | B1 | 9/2021 |

* cited by examiner

VEHICLE DETECTION METHOD, AND CONTROLLER, PROGRAM AND STORAGE MEDIUM

CROSS-REFERENCE TO RELATED APPLICATIONS

This application is a continuation application of International Patent Application No. PCT/CN2023/084896, filed on Mar. 29, 2023, which is based on and claims priority to and benefits of Chinese Patent Application No. 202210771256.7, filed on Jun. 30, 2022. The entire content of all of the above-referenced applications is incorporated herein by reference.

FIELD

The present disclosure relates to the technical field of vehicles, and more particularly, to a vehicle detection method, and a controller, a program and a storage medium.

BACKGROUND

In an existing rail transit signal system, a large quantity of axle counting devices are disposed along the tracks. These axle counting devices are used for assessing train section occupancy, clearance, front and rear screening of trains, and other functions. Currently, a detection axle counter is generally disposed outside the parking garage line to detect whether there is a non-communication train entering a main line and operating, so as to avoid a non-communication train appearing on a line where vehicles communicate, thereby causing a safety risk to a vehicle running on the line. However, the detection axle counter is easily interfered with, and a manual reset is required when interference occurs to restore normal detection. As a result, a detection result of the axle counter is inaccurate, which affects the safety of the vehicle-to-vehicle communication line.

SUMMARY

The present disclosure is to resolve one of technical problems in the related art at least to some extent.

Therefore, a first aspect of the present disclosure is to provide a vehicle detection method, to resolve a technical problem in the related art that a vehicle cannot be accurately detected.

A second aspect of the present disclosure is to provide a controller.

A third aspect of the present disclosure is to provide a computer program.

A fourth aspect of the present disclosure is to provide a non-transitory computer-readable storage medium.

To achieve the above aspects, an embodiment of a first aspect of the present disclosure proposes a vehicle detection method. The method includes:

acquiring point cloud data of a target detection area and image information of the target detection area;

in response to determining, according to the point cloud data, that a target vehicle exists in the target detection area, determining a target vehicle type of the target vehicle according to the point cloud data;

determining a target vehicle identifier of the target vehicle according to the image information; and querying a legitimate-vehicle information database with the target vehicle type and the target vehicle identifier, to determine whether the target vehicle is an illegitimate vehicle, where the legitimate-vehicle information database includes a vehicle type and a vehicle identifier of a legitimate vehicle, and the legitimate vehicle has a normal communication function and runs on a main line.

According to an embodiment of the present disclosure, the querying a legitimate-vehicle information database with the target vehicle type and the target vehicle identifier, to determine whether the target vehicle is an illegitimate vehicle includes:

determining whether the legitimate-vehicle information database includes the target vehicle type and the target vehicle identifier; and in response to determining that the legitimate-vehicle information database includes the target vehicle type and the target vehicle identifier, determining that the target vehicle is a legitimate vehicle; or in response to determining that the legitimate-vehicle information database does not include the target vehicle type and the target vehicle identifier, determining that the target vehicle is an illegitimate vehicle.

According to an embodiment of the present disclosure, the method further includes:

determining a control section according to a location of the illegitimate vehicle; and sending speed limit information to a vehicle located in the control section, the speed limit information instructs the vehicle in the control section to travel at a speed less than or equal to a speed limit.

According to an embodiment of the present disclosure, the determining a control section according to a location of the illegitimate vehicle includes:

when the illegitimate vehicle is not in the target detection area and does not pass through a first detection area, determining a section between the target detection area and the first detection area as the control section, the first detection area being a detection area closest to the target detection area along a traveling direction of the illegitimate vehicle.

According to an embodiment of the present disclosure, the method further includes: when the target vehicle is an illegitimate vehicle and a first switch change request message sent by the vehicle located in the control section is received, refusing to respond to the first switch change request message.

According to an embodiment of the present disclosure, the method further includes:

when the target vehicle is an illegitimate vehicle and a second switch change request message sent by a train automatic monitoring system is received, executing the second switch change request message.

According to an embodiment of the present disclosure, the method further includes:

when the target vehicle is an illegitimate vehicle, sending alarm information to the train automatic monitoring system, the alarm information instructs the train automatic monitoring system to prompt an alarm.

According to an embodiment of the present disclosure, the acquiring point cloud data of a target detection area and image information of the target detection area includes:

acquiring the point cloud data of the target detection area by using a laser radar; and acquiring the image information of the target detection area by using a camera.

According to an embodiment of the present disclosure, the method further includes:

inputting the point cloud data into a recognition model, and outputting a target shape from the recognition model; and when the target shape matches a vehicle shape, determining that the target vehicle exists in the target detection area.

The embodiment of the first aspect of the present disclosure proposes a vehicle detection method. The point cloud data of the target detection area and the image information of the target detection area are first acquired. When it is determined, according to the point cloud data, that a target vehicle exists in the target detection area, a target vehicle type of the target vehicle is determined according to the point cloud data, and a target vehicle identifier of the target vehicle is determined according to the image information. Then, the target vehicle type and the target vehicle identifier are compared or queried with a legitimate-vehicle information database to determine whether the target vehicle is an illegitimate vehicle, where the legitimate-vehicle information database includes a vehicle type and a vehicle identifier of a legitimate vehicle, and the legitimate vehicle is a vehicle which has a normal communication function and runs on a main line. In the present disclosure, the target vehicle type and the target vehicle identifier of the target vehicle are determined according to the acquired point cloud data and image information, so that whether the vehicle is an illegitimate vehicle can be determined according to the target vehicle type and the target vehicle identifier, and an illegitimate vehicle can be more accurately detected.

To achieve the foregoing aspects, an embodiment of a second aspect of the present disclosure proposes a controller. The controller includes:

a memory, storing computer-readable code; and one or more processors, where when the computer-readable code is executed by the one or more processors, the controller executes the vehicle detection method proposed in the embodiment of the first aspect of the present disclosure.

To achieve the foregoing aspects, an embodiment of a third aspect of the present disclosure proposes a computer program, including computer-readable code. When the computer-readable code runs on a controller, the controller is configured to execute the vehicle detection method proposed in the embodiment of the first aspect of the present disclosure.

To achieve the foregoing aspects, an embodiment of a fourth aspect of the present disclosure proposes a non-transitory computer-readable storage medium, storing the computer program proposed in the embodiment of the third aspect of the present disclosure.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure become apparent and comprehensible in the description made with reference to the following accompanying drawings, where.

DETAILED DESCRIPTION

Implementations of the present disclosure are described in detail below with reference to the accompanying drawings. It should be understood that the implementations described herein are merely used to describe and explain the present disclosure, but are not to limit the present disclosure.

Before the vehicle detection method, the controller, the program, and the storage medium provided in the present disclosure are described, application scenarios of embodiments of the present disclosure are first described. A vehicle in the application scenario may be any vehicle that runs on a preset track, for example, a train, a subway, a light rail, a tram, or the like. Vehicles running on a preset track may use a TACS (Train Autonomous Circumambulate System) for communication. However, when a vehicle that is not equipped with a TACS device or whose TACS device is faulty runs on a vehicle-to-vehicle communication line, a safety risk may be brought to the vehicle-to-vehicle communication line.

Figure 1:
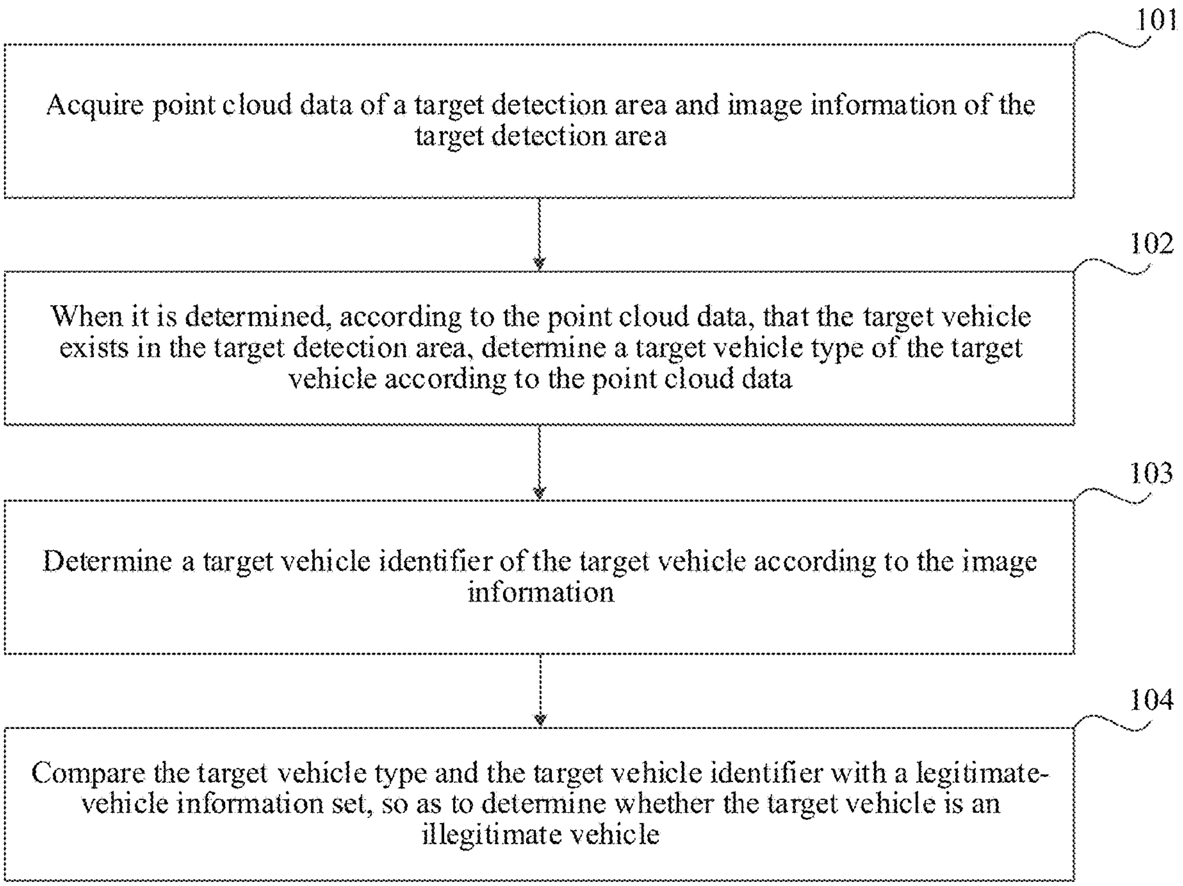
FIG. 1 is a flowchart of a vehicle detection method according to an embodiment.

FIG. 1 is a flowchart of a vehicle detection method according to an embodiment. As shown in FIG. 1, the method is applied to a controller, and the method may include the following steps.

Step 101: Acquire point cloud data of a target detection area and image information of the target detection area.

For example, an execution body of the present disclosure may be an object controller (Object Controller, OC). A location of a transfer rail on which a parking garage line intersects a main line may be used as the target detection area, and a detection apparatus is disposed near the transfer rail. The detection apparatus acquires the point cloud data of the target detection area and the image information of the target detection area, for example, may acquire the point cloud data by using a radar, and acquire the image information by using a camera. After a target object enters the target detection area, the controller determines a shape of the target object according to point cloud data of the target detection area, and determines, according to the shape of the target object, whether the target object is a target vehicle. In some embodiments, the point cloud data may be input into a pre-trained recognition model to obtain the shape of the target object output by the recognition model, and whether the target object is the target vehicle is determined according to a degree of matching between the shape of the target object and a preset vehicle shape.

Step 102: When it is determined, according to the point cloud data, that the target vehicle exists in the target detection area, determine a target vehicle type of the target vehicle according to the point cloud data.

Step 103: Determine a target vehicle identifier of the target vehicle according to the image information.

For example, if it is detected that the target vehicle exists in the target detection area, the target vehicle type of the target vehicle may be further determined according to the point cloud data. The vehicle type may include, for example, a communication train, an ordinary train, and the like. In some embodiments, a vehicle type recognition model may be pre-trained, and the target vehicle type output by the vehicle type recognition model may be obtained by inputting the point cloud data into the vehicle type recognition model. In addition, the target vehicle identifier of the target vehicle in the image information may be acquired by using an image recognition method, where the vehicle identifier may be a vehicle number. In an implementation, a text recognition model that is used to recognize text information in an image may be pre-trained, and after the image information is acquired, the image information is input into the text recognition model to obtain the target vehicle identifier output by the text recognition model. In another implementation, the target vehicle identifier in the image information may be obtained by processing the image information by using a preset text recognition algorithm. This is not limited in the present disclosure.

Step 104: Compare the target vehicle type and the target vehicle identifier with a legitimate-vehicle information database, such as querying the legitimate-vehicle information database with the target vehicle type and the target vehicle identifier, so as to determine whether the target vehicle is an illegitimate vehicle, where the legitimate-vehicle information database includes a vehicle type and a vehicle identifier of a legitimate vehicle, and the legitimate vehicle is a vehicle which has a normal communication function and runs on a main line.

For example, after the target vehicle type and the target vehicle identifier are obtained, the target vehicle type and the target vehicle identifier may be compared or queried with the legitimate-vehicle information database, the target vehicle type and the target vehicle identifier are searched for in the legitimate-vehicle information database, and whether the target vehicle is an illegitimate vehicle is determined according to whether the target vehicle type and the target vehicle identifier exist in the legitimate-vehicle information database. The vehicle type and the vehicle identifier of the legitimate vehicle are stored in the legitimate-vehicle information database. In an implementation, the legitimate vehicle and the illegitimate vehicle may be pre-determined, and the vehicle type and the vehicle identifier of the legitimate vehicle are stored in the legitimate-vehicle information database. The legitimate vehicle may be understood as a vehicle which has a normal communication function and runs on a main line, for example, a vehicle that is equipped with a TACS device and whose TACS device is normal. The illegitimate vehicle may be understood as a vehicle whose communication function is abnormal, for example, a vehicle that is not equipped with a TACS device or whose TACS device is faulty. In another implementation, after entering the main line, the legitimate vehicle may send the vehicle type and the vehicle identifier of the vehicle to the controller, and the controller may store the vehicle type and the vehicle identifier of the legitimate vehicle in the legitimate-vehicle information database. If the target vehicle type and the target vehicle identifier exist in the preset legitimate-vehicle information database, the target vehicle may be determined as a legitimate vehicle. If the target vehicle type and the target vehicle identifier do not exist in the preset legitimate-vehicle information database, the target vehicle may be determined as an illegitimate vehicle.

In conclusion, in the present disclosure, the point cloud data of the target detection area and the image information of the target detection area are first acquired. When it is determined, according to the point cloud data, that a target vehicle exists in the target detection area, a target vehicle type of the target vehicle is determined according to the point cloud data, and a target vehicle identifier of the target vehicle is determined according to the image information. Then, the target vehicle type and the target vehicle identifier are compared with a legitimate-vehicle information database to determine whether the target vehicle is an illegitimate vehicle, where the legitimate-vehicle information database includes a vehicle type and a vehicle identifier of a legitimate vehicle, and the legitimate vehicle is a vehicle which has a normal communication function and runs on a main line. In the present disclosure, the target vehicle type and the target vehicle identifier of the target vehicle are determined according to the acquired point cloud data and image information, so that whether the vehicle is an illegitimate vehicle can be determined according to the target vehicle type and the target vehicle identifier, and an illegitimate vehicle can be more accurately detected.

Figure 2:
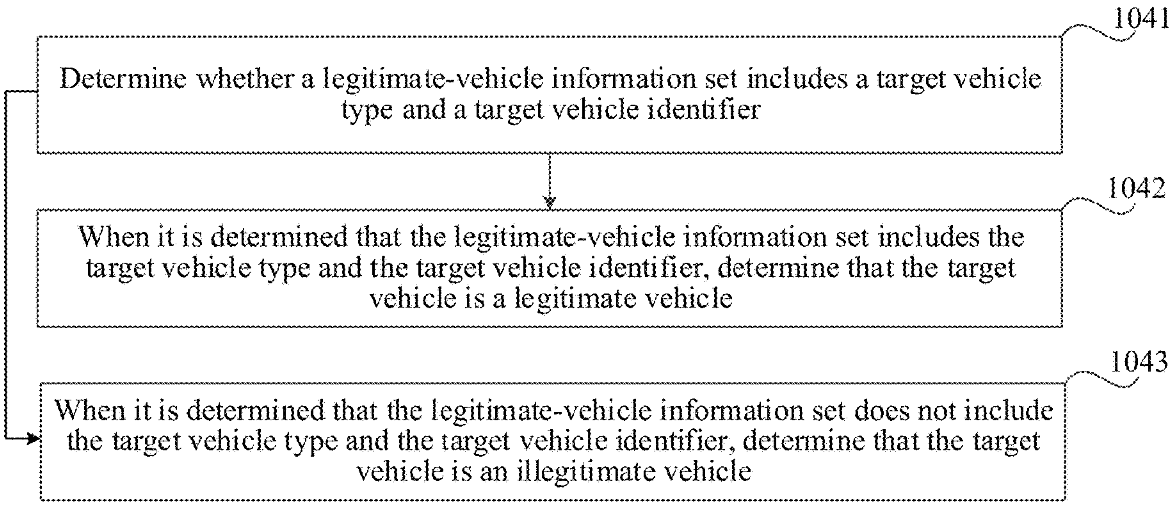
FIG. 2 is a flowchart of another vehicle detection method according to an embodiment.

FIG. 2 is a flowchart of another vehicle detection method according to an embodiment. As shown in FIG. 2, step 104 may be implemented in the following manner.

Step 1041: Determine whether the legitimate-vehicle information database includes the target vehicle type and the target vehicle identifier.

Step 1042: When it is determined that the legitimate-vehicle information database includes the target vehicle type and the target vehicle identifier, determine that the target vehicle is a legitimate vehicle.

Step 1043: When it is determined that the legitimate-vehicle information database does not include the target vehicle type and the target vehicle identifier, determine that the target vehicle is an illegitimate vehicle.

For example, when a vehicle leaves the garage and enters the main line from the transfer rail for operation, if the vehicle is a communication train equipped with a TACS device, the vehicle sends a vehicle type and a vehicle identifier to the controller, and the controller may add the vehicle type and the vehicle identifier to the legitimate-vehicle information database. If the vehicle is an illegitimate vehicle that is not equipped with a TACS device or has communication function failures such as ATP (Automatic Train Protection) cutoff, the vehicle cannot send the vehicle type and the vehicle identifier to the controller. Therefore, the vehicle type and the vehicle identifier of the vehicle do not exist in the legitimate-vehicle information database. Therefore, after the target vehicle type and the target vehicle identifier of the target vehicle are acquired, the target vehicle type and the target vehicle identifier may be searched for in the legitimate-vehicle information database. If the legitimate-vehicle information database includes the target vehicle type and the target vehicle identifier, which indicates that a communication function of the target vehicle is normal, the vehicle may be determined as a legitimate vehicle. If the legitimate-vehicle information database does not include the target vehicle type and the target vehicle identifier, which indicates that the communication function of the target vehicle is faulty, and the target vehicle type and the target vehicle identifier are not sent to the controller, it may be determined that the target vehicle is an illegitimate vehicle.

In other embodiments, when a vehicle leaves the garage and enters the main line from the transfer rail for operation, the vehicle may further be positioned, and a vehicle location and a vehicle identifier are sent to the controller. The controller may add the vehicle location and the vehicle identifier to the legitimate-vehicle information database. The legitimate-vehicle information database includes a vehicle location and the vehicle identifier of the legitimate vehicle. Therefore, the target vehicle identifier and a target vehicle location of the target vehicle may be acquired, and the target vehicle identifier and the target vehicle location are searched for in the legitimate-vehicle information database. If the legitimate-vehicle information database includes the target vehicle identifier and the target vehicle location, which indicates that the communication function of the target vehicle is normal, the vehicle may be determined as a legitimate vehicle. If the legitimate-vehicle information database does not include the target vehicle identifier and the target vehicle location, which indicates that the communication function of the target vehicle is faulty, and therefore the target vehicle identifier and the target vehicle location are not sent to the controller, it may be determined that the target vehicle is an illegitimate vehicle.

Figure 3:
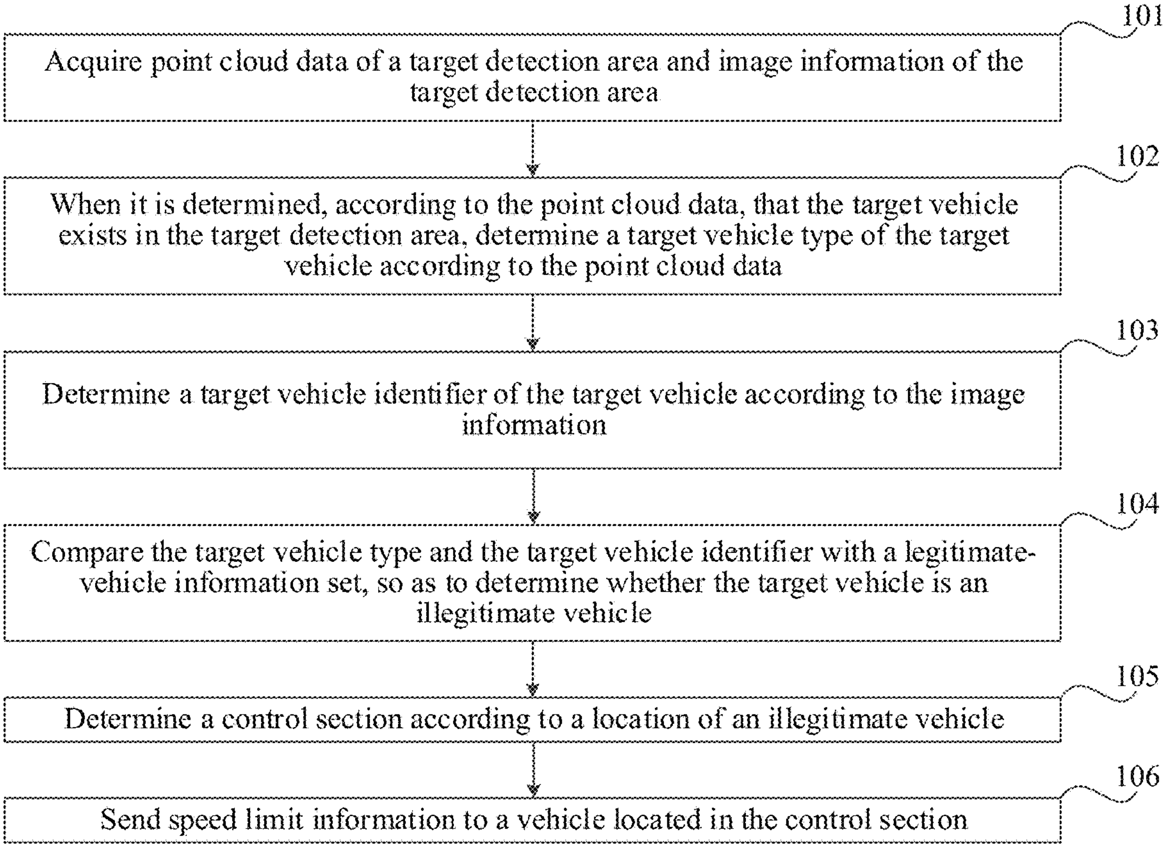
FIG. 3 is a flowchart of another vehicle detection method according to an embodiment.

FIG. 3 is a flowchart of another vehicle detection method according to an embodiment. As shown in FIG. 3, the method may further include the following steps.

Step 105: Determine a control section according to a location of an illegitimate vehicle.

Step 106: Send speed limit information to a vehicle located in the control section, where the speed limit information is used to instruct the vehicle in the control section to travel at a speed less than or equal to a specified vehicle speed, such as a speed limit.

In an application scenario, an implementation of step 105 may be as follows:

When the illegitimate vehicle is not in the target detection area and the illegitimate vehicle does not pass through a specified detection area (e.g., a first detection area), a section between the target detection area and the specified detection area is used as the control section, and the specified detection area is a detection area closest to the target detection area along a traveling direction of the illegitimate vehicle.

Figure 4:
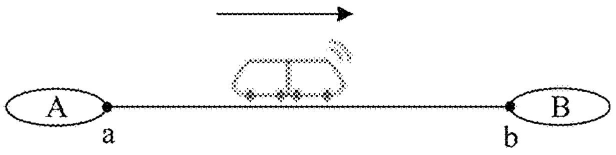
FIG. 4 is a diagram of a control section according to the embodiment of FIG. 3.

For example, because a plurality of detection areas are disposed on the main line, after it is detected that the illegitimate vehicle leaves the target detection area, it may be further determined whether the illegitimate vehicle passes through the detection area closest to the target detection area along the traveling direction of the illegitimate vehicle. If the illegitimate vehicle does not pass through the specified detection area, it indicates that the illegitimate vehicle runs in a section between the target detection area and the specified detection area, and therefore, the section between the target detection area and the specified detection area may be used as the control section. As shown in FIG. 4, an area A is the target detection area, an area B is the specified detection area, and an ab section between the area A and the area B is the control section. To ensure traveling safety of the vehicle in the control section, the controller may send the speed limit information to all legitimate vehicles in the control section, so as to instruct the vehicle in the control section to travel at a speed less than or equal to the specified vehicle speed, to ensure safe traveling of the vehicle in the control section. In some embodiments, the controller may further instruct the legitimate vehicle in the control section to enable an anti-collision mode. In the anti-collision mode, the vehicle may detect an obstacle in front of the vehicle, so as to control vehicle deceleration or emergency braking. In this way, collision between the vehicle in the control section and an illegitimate vehicle can be avoided.

Figure 5:
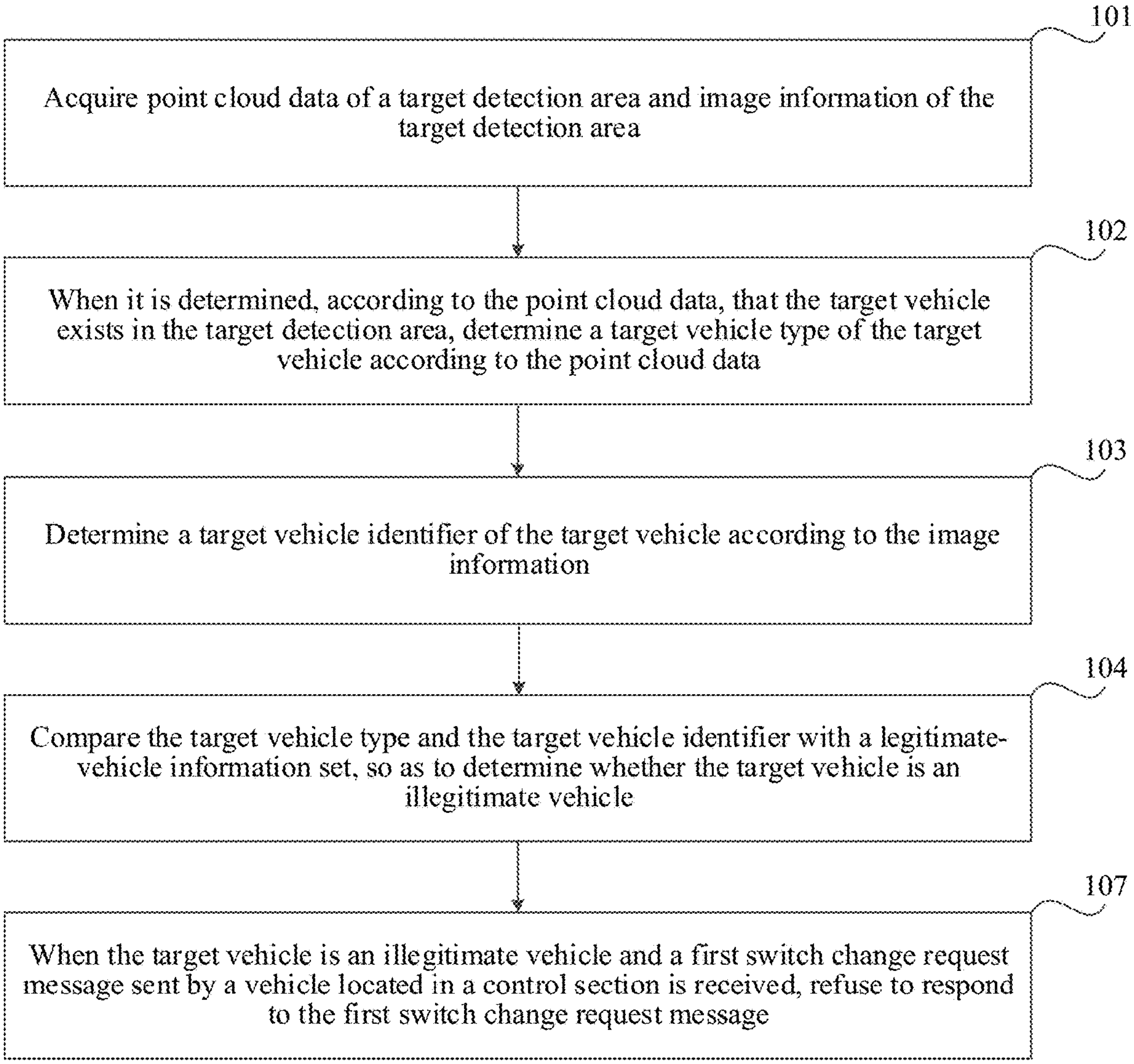
FIG. 5 is a flowchart of another vehicle detection method according to an embodiment.

FIG. 5 is a flowchart of another vehicle detection method according to an embodiment. As shown in FIG. 5, the method may further include the following step.

Step 107: When the target vehicle is an illegitimate vehicle and a first switch change request message sent by the vehicle located in the control section is received, refuse to respond to the first switch change request message.

For example, when it is determined that the target vehicle is an illegitimate vehicle, if the first switch change request message sent by the vehicle located in the control section is received, it indicates that the vehicle in the control section requests to change the switch. Because the illegitimate vehicle is in the control section at this moment, if the switch change is performed, an accident may occur. Therefore, it is permissible to refuse to respond to the first switch change request message sent by the vehicle.

Figure 6:
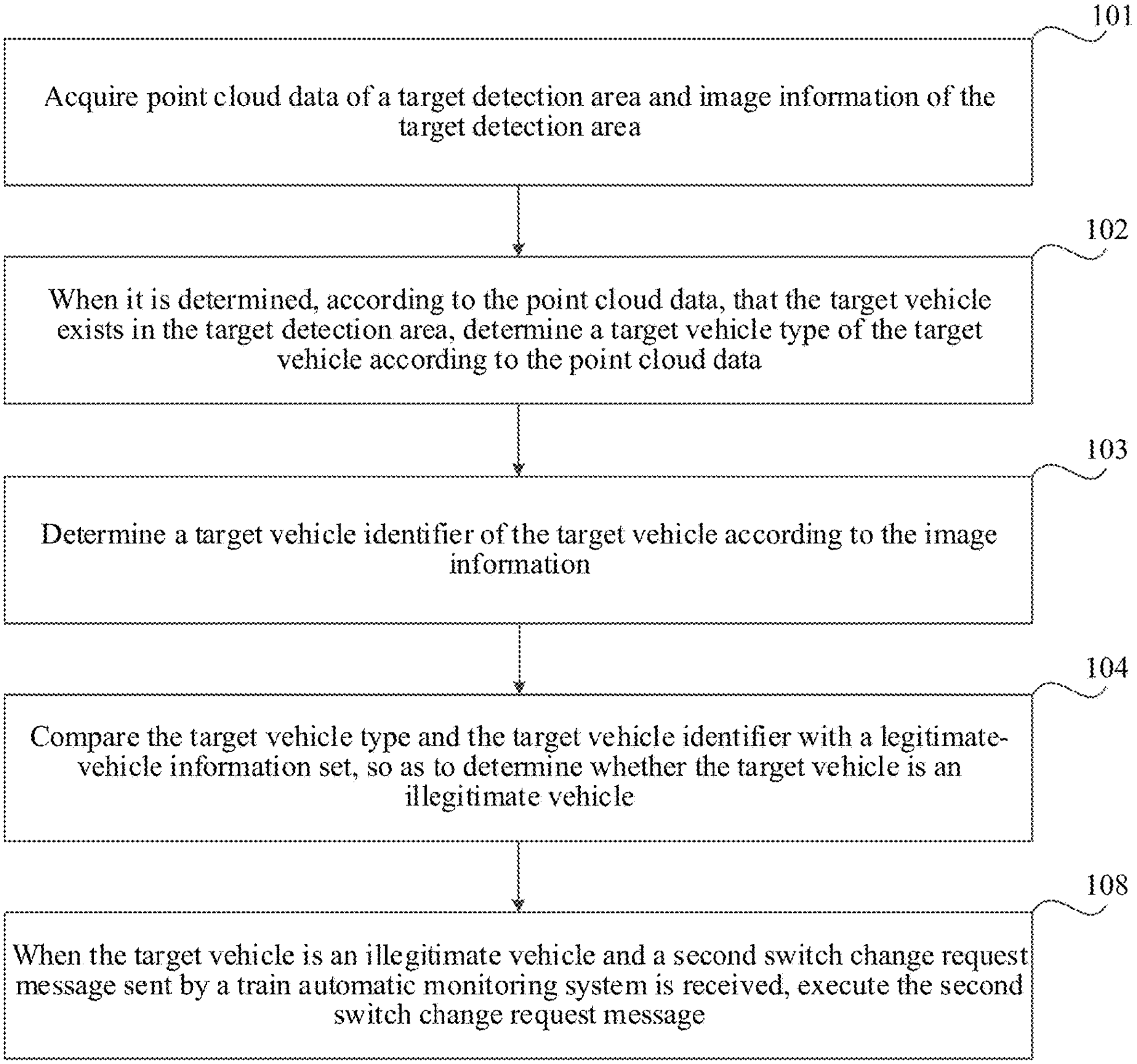
FIG. 6 is a flowchart of another vehicle detection method according to an embodiment.

FIG. 6 is a flowchart of another vehicle detection method according to an embodiment. As shown in FIG. 6, the method may further include the following step.

Step 108: When the target vehicle is an illegitimate vehicle and a second switch change request message sent by a train automatic monitoring system is received, execute the second switch change request message.

For example, when it is determined that the target vehicle is an illegitimate vehicle, if the second switch change request message sent by the train automatic monitoring system is received, it indicates that the train automatic monitoring system requests to change a switch. The train automatic monitoring system may be ATS (Automatic Train Supervision). The train automatic monitoring system sends the second switch change request message according to a running status of all vehicles running in the control section, which aims to ensure safe running of the vehicles in the control section. Therefore, the second switch change request message may be executed.

Figure 7:
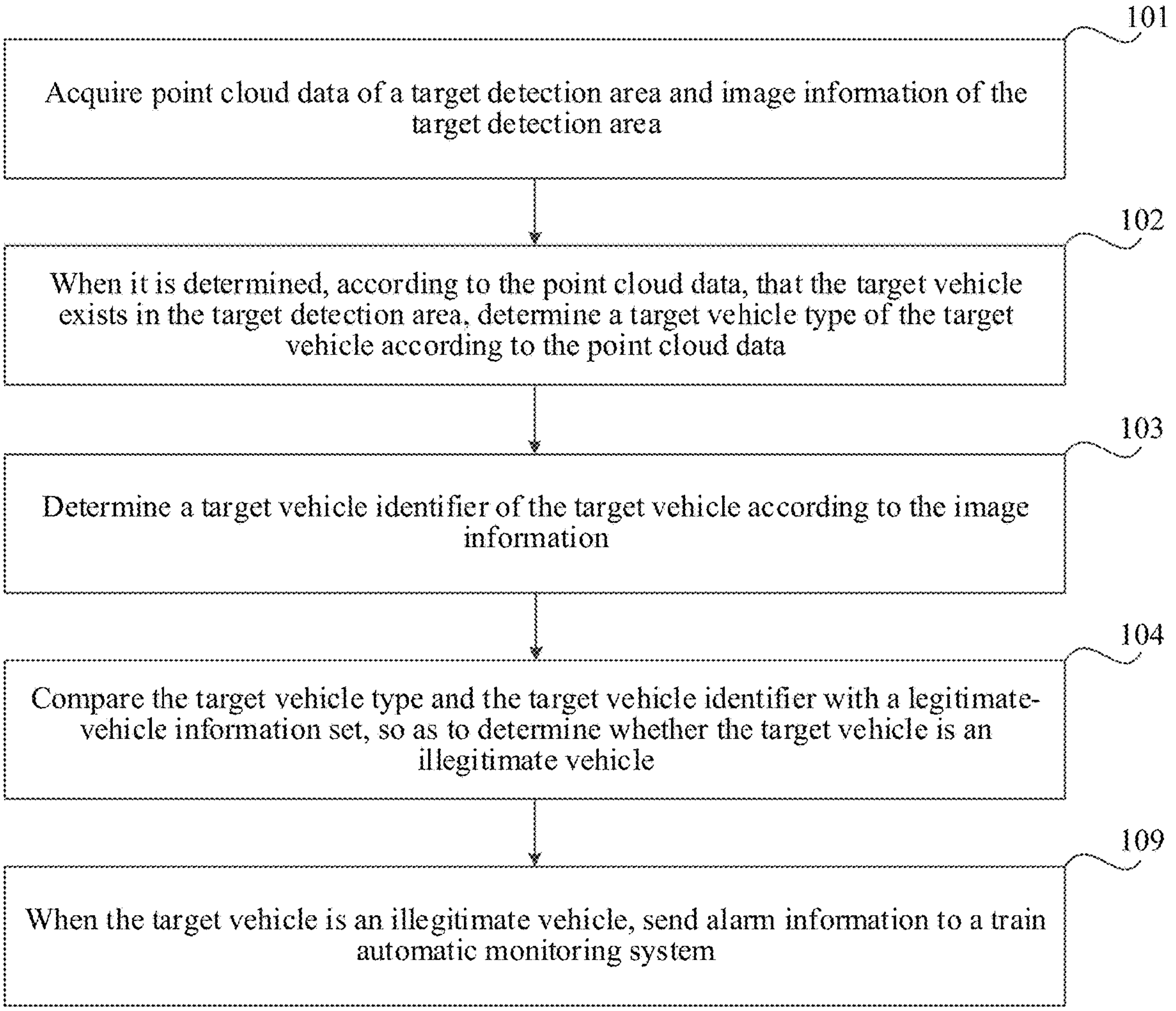
FIG. 7 is a flowchart of another vehicle detection method according to an embodiment.

FIG. 7 is a flowchart of another vehicle detection method according to an embodiment. As shown in FIG. 7, the method may further include the following step.

Step 109: When the target vehicle is an illegitimate vehicle, send alarm information to the train automatic monitoring system, where the alarm information is used to instruct the train automatic monitoring system to give an alarm prompt, such as prompt an alarm.

For example, if it is determined that the target vehicle is an illegitimate vehicle, alarm information may be sent to the train automatic monitoring system. After receiving the alarm information, the train automatic monitoring system may send an alarm prompt indicating that an illegitimate vehicle enters the main line. The alarm prompt may be a sound prompt, a light prompt, or the like. In some embodiments, the controller may further send the target vehicle identifier of the target vehicle to the train automatic monitoring system, so that the train automatic monitoring system acquires detailed information of the target vehicle according to the target vehicle identifier.

Figure 8:
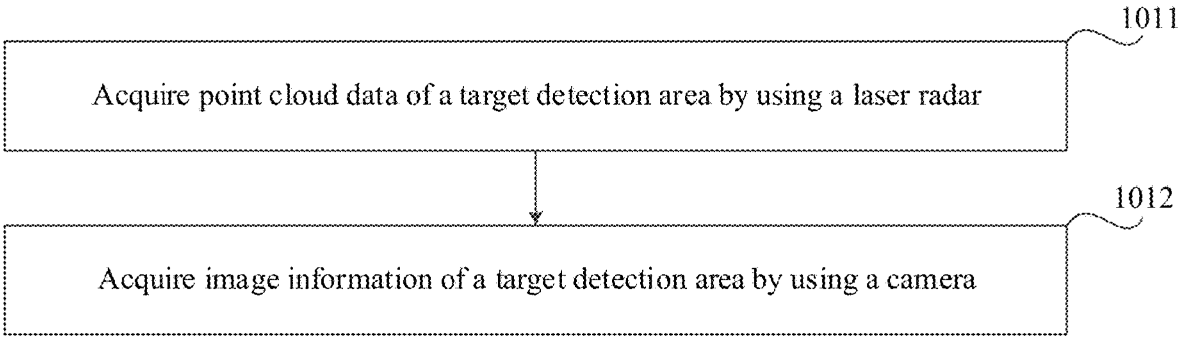
FIG. 8 is a flowchart of another vehicle detection method according to an embodiment.

FIG. 8 is a flowchart of another vehicle detection method according to an embodiment. As shown in FIG. 8, step 101 may be implemented in the following manner.

Step 1011: Acquire the point cloud data of the target detection area by using a laser radar.

Step 1012: Acquire the image information of the target detection area by using a camera.

Figure 9:
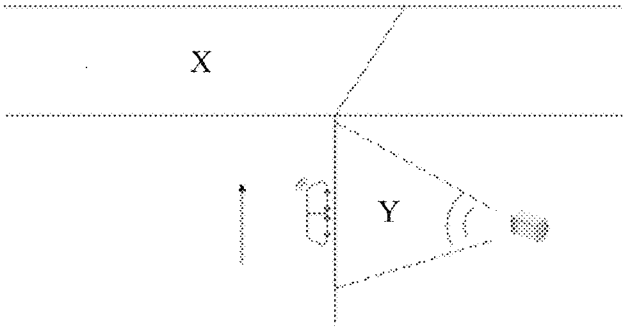
FIG. 9 is a diagram of a radar-vision range according to the embodiment of FIG. 8.

For example, a detection apparatus may be disposed at a position of the target detection area. The detection apparatus may include a radar and a camera. The radar may be, for example, a radar that may acquire point cloud data, for example, a laser radar. The camera may be, for example, a monocular camera or a binocular camera. The detection apparatus may be disposed at a transfer rail, and the detection apparatus is higher than a rail plane. A carrier rod may be disposed near the transfer rail, or an apparatus rod of a base station disposed near the transfer rail may be used. As shown in FIG. 9, the X area is an area in which the main line is located, the Y area is a radar-vision range of a radar and a camera, and a section length in an area of the radar-vision range covered by the radar and the camera should be greater than one and a half times the length of a vehicle, so as to ensure accuracy of recognizing a vehicle by the detection apparatus. The point cloud data of the target detection area may be acquired by using the radar, and the image information of the target detection area may be acquired by using the camera.

Figure 10:
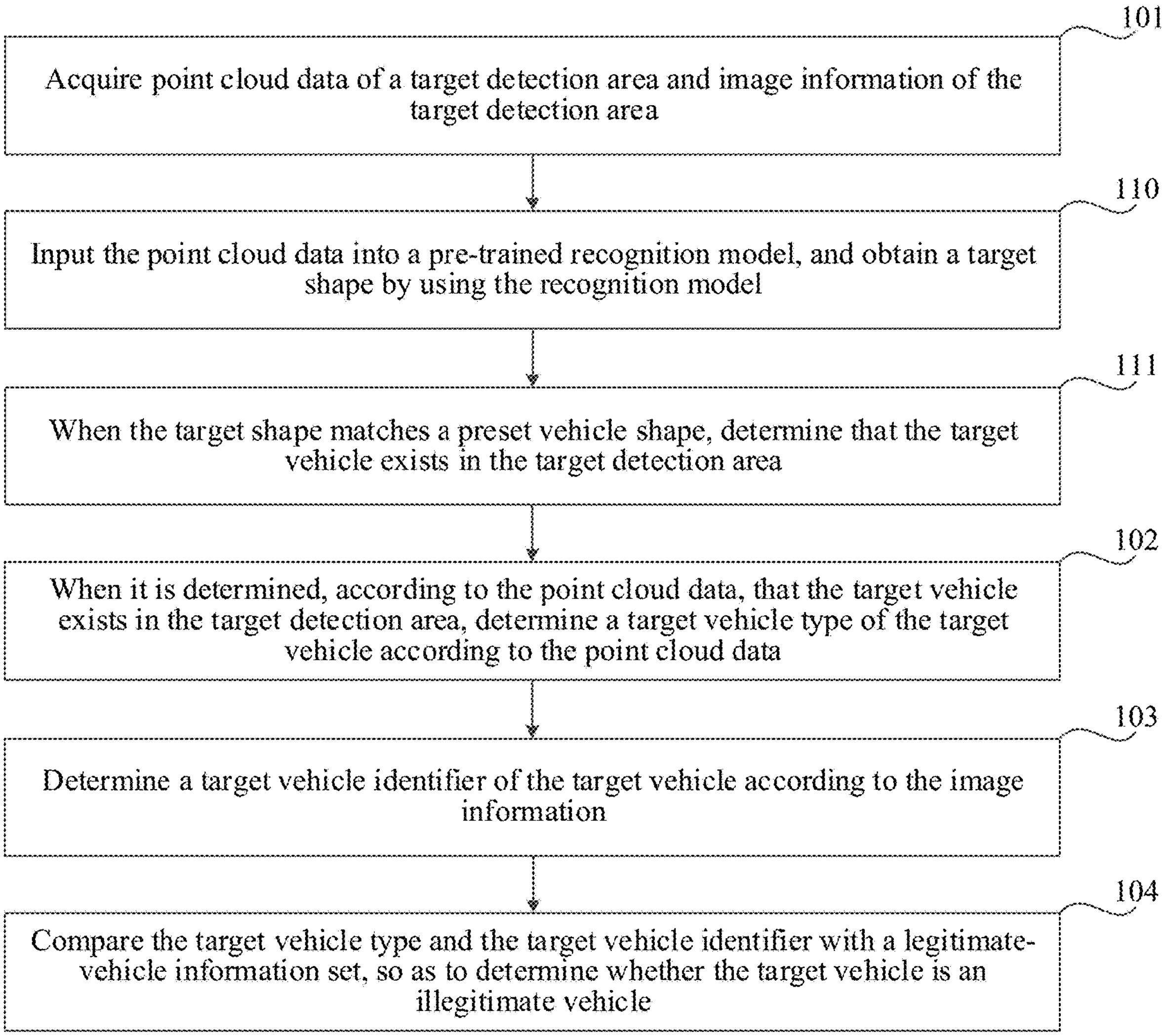
FIG. 10 is a flowchart of another vehicle detection method according to an embodiment.

FIG. 10 is a flowchart of another vehicle detection method according to an embodiment. As shown in FIG. 10, the method may further include the following steps.

Step 110: Input the point cloud data into a pre-trained recognition model, and obtain a target shape by using the recognition model.

Step 111: When the target shape matches a preset vehicle shape, determine that the target vehicle exists in the target detection area.

For example, a recognition model for recognizing an object shape according to point cloud data may be trained in advance. After the point cloud data is acquired, the point cloud data may be input into the pre-trained recognition model. The recognition model may process the point cloud data, and output a target shape corresponding to the point cloud data. After the target shape is obtained, the target shape may be compared with the preset vehicle shape. If the target shape matches the preset vehicle shape, it may be determined that the target vehicle exists in the target detection area. In an implementation, a similarity threshold may be preset. If similarity between the target shape and the preset vehicle shape is greater than or equal to the similarity threshold, it may be considered that the target shape matches the preset vehicle shape.

In conclusion, in the present disclosure, the point cloud data of the target detection area and the image information of the target detection area are first acquired. When it is determined, according to the point cloud data, that a target vehicle exists in the target detection area, a target vehicle type of the target vehicle is determined according to the point cloud data, and a target vehicle identifier of the target vehicle is determined according to the image information. Then, the target vehicle type and the target vehicle identifier are compared with a legitimate-vehicle information database to determine whether the target vehicle is an illegitimate vehicle, where the legitimate-vehicle information database includes a vehicle type and a vehicle identifier of a legitimate vehicle, and the legitimate vehicle is a vehicle which has a normal communication function and runs on a main line. In the present disclosure, the target vehicle type and the target vehicle identifier of the target vehicle are determined according to the acquired point cloud data and image information, so that whether the vehicle is an illegitimate vehicle can be determined according to the target vehicle type and the target vehicle identifier, and an illegitimate vehicle can be more accurately detected.

To implement the foregoing embodiments, the present disclosure further provides a controller, including:

a memory, storing computer-readable code; and one or more processors, where when the computer-readable code is executed by the one or more processors, the controller executes the foregoing vehicle detection method.

To implement the foregoing embodiments, the present disclosure further proposes a computer program, including computer-readable code. When the computer-readable code is executed on a controller, the controller is enabled to execute the foregoing vehicle detection method.

To implement the foregoing embodiments, the present disclosure further proposes a non-transitory computer-readable storage medium, storing the foregoing computer program.

Figure 11:
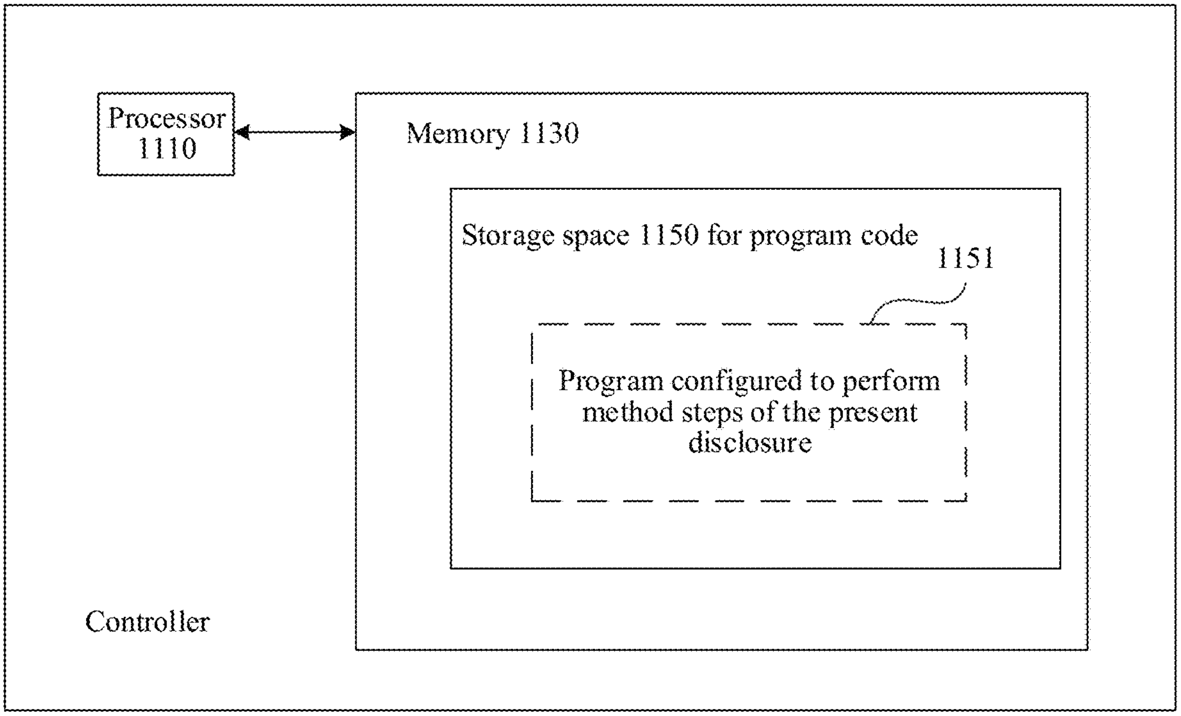
FIG. 11 is a diagram of a controller according to an embodiment.
Figure 12:
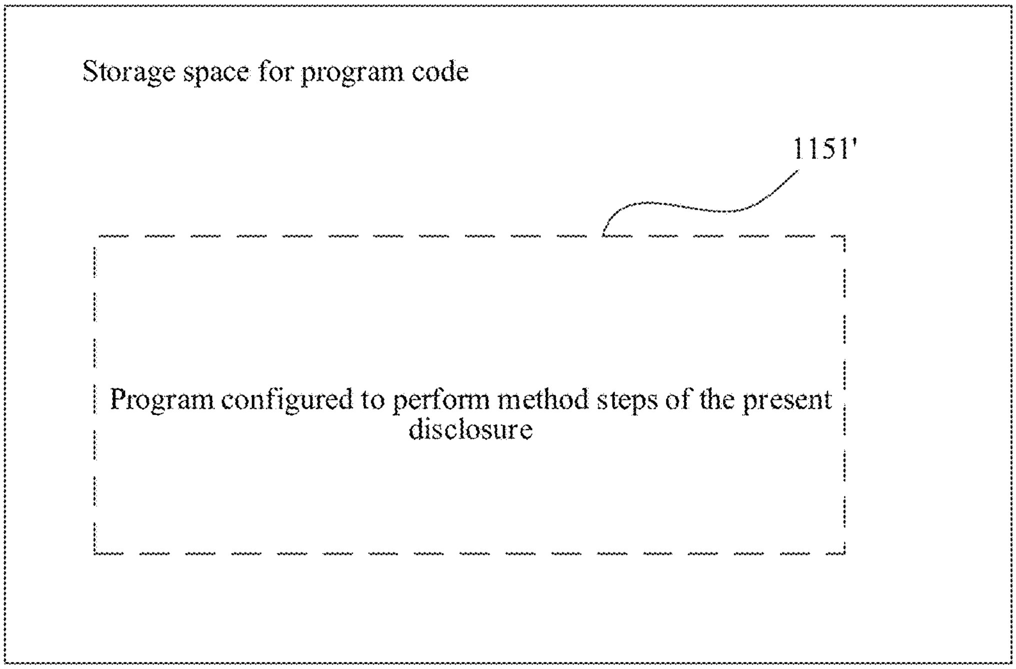
FIG. 12 is a diagram of a portable or fixed storage unit for program code implementing the method of the present disclosure according to an embodiment.

FIG. 11 is a diagram of a structure of a controller according to an embodiment of the present disclosure. The controller generally includes a processor 1110 and a computer program product or a computer-readable medium in a form of a memory 1130. The memory 1130 may be an electronic memory such as a flash memory, an EEPROM (electrically erasable programmable read-only memory), an EPROM, a hard disk, or a ROM. The memory 1130 has a storage space 1150 for program code 1151 configured to perform any method step in the foregoing method. For example, the storage space 1150 for program code may include individual program code 1151 configured to implement various steps in the foregoing method, respectively. These pieces of program code may be read from or written to one or more computer program products. These computer program products include program code carriers such as hard disks, compact disks (CDs), storage cards, or floppy disks. Such a computer program product is generally a portable or fixed storage unit shown in FIG. 12. The storage unit may have a storage section, storage space, and the like that are arranged in a similar manner to the memory 1130 in the server shown in FIG. 11. Program code may be compressed, for example, in an appropriate form. Generally, the storage unit includes computer-readable code 1151', that is, code that may be read by a processor such as 1110. When the server runs the code, the server is enabled to perform steps in the method described above.

In the description of this specification, the description of the reference terms "an embodiment", "some embodiments", "an example", "a specific example", "some examples" and the like means that features, structures, materials or characteristics described in combination with the embodiment(s) or example(s) are included in at least one embodiment or example of the present disclosure. In this specification, schematic descriptions of the foregoing terms are not necessarily directed at the same embodiment or example. Besides, the features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include at least one of such features. In the descriptions of the present disclosure, unless explicitly specified, "a plurality of" means at least two, for example, two or three.

A description of any process or method in the flowcharts or described herein in another manner can be construed as representing one or more modules, fragments, or parts that include code of executable instructions used to implement a logical function or steps of a process. In addition, the scope of the exemplary implementations of the present disclosure includes another implementation, where functions can be performed not in an order shown or discussed, including performing the functions basically at the same time or in reverse order according to the functions involved. This should be understood by a person skilled in the technical field to which the embodiments of the present disclosure belong.

The logic and/or steps shown in the flowcharts or described in any other manner herein, for example, a sequenced list that may be considered as executable instructions used for implementing logical functions, may be implemented in any computer-readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More examples (a non-exhaustive list) of the computer-readable medium include the following: an electrical connection (electronic device) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium can even be paper or other suitable media on which the program can be printed, because the program can be obtained electronically by, for example, optically scanning paper or other media, then editing, interpreting, or processing in other suitable ways if necessary, and then storing it in a computer memory.

It should be understood that, parts of the present disclosure can be implemented by using hardware, software, firmware, or a combination thereof. In the foregoing implementations, a plurality of steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person of ordinary skill in the art may understand that all or some of the steps of the methods in the foregoing embodiments may be implemented by a program instructing relevant hardware. The program may be stored in a non-transitory computer-readable storage medium. When the program is executed, one or a combination of the steps of the method embodiments are performed.

In addition, functional units according to the embodiments of the present disclosure may be integrated in one processing module or exist as separate physical units, or two or more units are integrated into one module. The integrated module may be implemented in the form of hardware, or may be implemented in a form of a software functional module. If implemented in the form of software functional modules and sold or used as an independent product, the integrated module may also be stored in a non-transitory computer-readable storage medium.

The storage medium mentioned above may be a read-only memory, a magnetic disk, an optical disc, or the like. Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A method for detecting a vehicle, comprising:

acquiring point cloud data of a target detection area and image information of the target detection area;

in response to determining, according to the point cloud data, that a target vehicle exists in the target detection area, determining a target vehicle type of the target vehicle according to the point cloud data;

determining a target vehicle identifier of the target vehicle according to the image information; and querying a legitimate-vehicle information database with the target vehicle type and the target vehicle identifier, to determine whether the target vehicle is an illegitimate vehicle, wherein the legitimate-vehicle information database comprises a vehicle type and a vehicle identifier of a legitimate vehicle, and the legitimate vehicle has a normal communication function and runs on a main line.

2. The method according to claim 1, wherein the querying a legitimate-vehicle information database with the target vehicle type and the target vehicle identifier, to determine whether the target vehicle is an illegitimate vehicle comprises:

determining whether the legitimate-vehicle information database comprises the target vehicle type and the target vehicle identifier; and in response to determining that the legitimate-vehicle information database comprises the target vehicle type and the target vehicle identifier, determining that the target vehicle is a legitimate vehicle; or in response to determining that the legitimate-vehicle information database does not comprise the target vehicle type and the target vehicle identifier, determining that the target vehicle is an illegitimate vehicle.

3. The method according to claim 2, further comprising:

determining a control section according to a location of the illegitimate vehicle; and sending speed limit information to a vehicle located in the control section, wherein the speed limit information instructs the vehicle in the control section to travel at a speed less than or equal to a speed limit.

4. The method according to claim 3, wherein the determining a control section according to a location of the illegitimate vehicle comprises:

when the illegitimate vehicle is not in the target detection area and does not pass through a first detection area, determining a section between the target detection area and the first detection area as the control section, the first detection area being a detection area closest to the target detection area along a traveling direction of the illegitimate vehicle.

5. The method according to claim 3, further comprising: when the target vehicle is an illegitimate vehicle and a first switch change request message sent by the vehicle located in the control section is received, refusing to respond to the first switch change request message.

6. The method according to claim 3, further comprising: when the target vehicle is an illegitimate vehicle and a second switch change request message sent by a train automatic monitoring system is received, executing the second switch change request message.

7. The method according to claim 1, further comprising: when the target vehicle is an illegitimate vehicle, sending alarm information to a train automatic monitoring system, wherein the alarm information instructs the train automatic monitoring system to prompt an alarm.

8. The method according to claim 1, wherein the acquiring point cloud data of a target detection area and image information of the target detection area comprises:

acquiring the point cloud data of the target detection area by using a laser radar; and acquiring the image information of the target detection area by using a camera.

9. The method according to claim 8, further comprising:

inputting the point cloud data into a recognition model, and outputting a target shape from the recognition model; and when the target shape matches a vehicle shape, determining that the target vehicle exists in the target detection area.

10. A controller, comprising:

a memory storing a computer program; and a processor configured to execute the computer program in the memory to perform operations comprising:

acquiring point cloud data of a target detection area and image information of the target detection area;

in response to determining, according to the point cloud data, that a target vehicle exists in the target detection area, determining a target vehicle type of the target vehicle according to the point cloud data;

determining a target vehicle identifier of the target vehicle according to the image information; and querying a legitimate-vehicle information database with the target vehicle type and the target vehicle identifier, to determine whether the target vehicle is an illegitimate vehicle, wherein the legitimate-vehicle information database comprises a vehicle type and a vehicle identifier of a legitimate vehicle, and the legitimate vehicle has a normal communication function and runs on a main line.

11. The controller according to claim 10, wherein the querying a legitimate-vehicle information database with the target vehicle type and the target vehicle identifier, to determine whether the target vehicle is an illegitimate vehicle comprises:

determining whether the legitimate-vehicle information database comprises the target vehicle type and the target vehicle identifier; and in response to determining that the legitimate-vehicle information database comprises the target vehicle type and the target vehicle identifier, determining that the target vehicle is a legitimate vehicle; or in response to determining that the legitimate-vehicle information database does not comprise the target vehicle type and the target vehicle identifier, determining that the target vehicle is an illegitimate vehicle.

12. The controller according to claim 11, wherein the operations further comprise:

determining a control section according to a location of the illegitimate vehicle; and sending speed limit information to a vehicle located in the control section, wherein the speed limit information instructs the vehicle in the control section to travel at a speed less than or equal to a speed limit.

13. The controller according to claim 12, wherein the determining a control section according to a location of the illegitimate vehicle comprises:

when the illegitimate vehicle is not in the target detection area and does not pass through a first detection area, determining a section between the target detection area and the first detection area as the control section, the first detection area being a detection area closest to the target detection area along a traveling direction of the illegitimate vehicle.

14. The controller according to claim 12, wherein the operations further comprise:

when the target vehicle is an illegitimate vehicle and a first switch change request message sent by the vehicle located in the control section is received, refusing to respond to the first switch change request message.

15. The controller according to claim 12, wherein the operations further comprise:

when the target vehicle is an illegitimate vehicle and a second switch change request message sent by a train automatic monitoring system is received, executing the second switch change request message.

16. The controller according to claim 10, wherein the operations further comprise:

when the target vehicle is an illegitimate vehicle, sending alarm information to a train automatic monitoring system, wherein the alarm information instructs the train automatic monitoring system to prompt an alarm.

17. The controller according to claim 10, wherein the acquiring point cloud data of a target detection area and image information of the target detection area comprises:

acquiring the point cloud data of the target detection area by using a laser radar; and acquiring the image information of the target detection area by using a camera.

18. The controller according to claim 17, wherein the operations further comprise:

inputting the point cloud data into a recognition model, and outputting a target shape from the recognition model; and when the target shape matches a vehicle shape, determining that the target vehicle exists in the target detection area.

19. A non-transitory computer-readable storage medium, storing a computer program, which when executed by a processor, causes the processor to perform operations comprising:

acquiring point cloud data of a target detection area and image information of the target detection area;

in response to determining, according to the point cloud data, that a target vehicle exists in the target detection area, determining a target vehicle type of the target vehicle according to the point cloud data;

determining a target vehicle identifier of the target vehicle according to the image information; and querying a legitimate-vehicle information database with the target vehicle type and the target vehicle identifier, to determine whether the target vehicle is an illegitimate vehicle, wherein the legitimate-vehicle information database comprises a vehicle type and a vehicle identifier of a legitimate vehicle, and the legitimate vehicle has a normal communication function and runs on a main line.

20. The non-transitory computer-readable storage medium according to claim 19, wherein the querying a legitimate-vehicle information database with the target vehicle type and the target vehicle identifier, to determine whether the target vehicle is an illegitimate vehicle comprises:

determining whether the legitimate-vehicle information database comprises the target vehicle type and the target vehicle identifier; and in response to determining that the legitimate-vehicle information database comprises the target vehicle type and the target vehicle identifier, determining that the target vehicle is a legitimate vehicle; or in response to determining that the legitimate-vehicle information database does not comprise the target vehicle type and the target vehicle identifier, determining that the target vehicle is an illegitimate vehicle.

* * * * *